United States Patent [19]

Philippe

[11] 4,245,163
[45] Jan. 13, 1981

[54] CONTROL INSTALLATION FOR AT LEAST TWO HYDRAULIC TURBINES

[75] Inventor: Maurice Philippe, Geneva, Switzerland

[73] Assignee: Ateliers des Charmilles S.A., Geneva, Switzerland

[21] Appl. No.: 915,990

[22] Filed: Jun. 14, 1978

[30] Foreign Application Priority Data

Jun. 30, 1977 [CH] Switzerland .................. 8044/77

[51] Int. Cl.³ .................................................. H02J 3/00
[52] U.S. Cl. ........................................ 290/52; 307/29; 60/709
[58] Field of Search .................. 307/29; 290/52, 4 C, 290/4 D; 60/709, 719, 335; 415/1

[56] References Cited

U.S. PATENT DOCUMENTS

| | | | |
|---|---|---|---|
| 3,829,232 | 8/1974 | Fieglein et al. | 415/1 |
| 4,049,299 | 9/1977 | Rigollot | 290/52 |
| 4,069,424 | 1/1978 | Burkett | 290/52 X |
| 4,077,748 | 3/1978 | Pötz | 290/52 X |

*Primary Examiner*—B. Dobeck
*Attorney, Agent, or Firm*—Emory L. Groff, Jr.

[57] ABSTRACT

A control installation for two or more hydraulic turbines enabling switching between individual control of each turbine and common control of some or all of the turbines, without interruption of operation for adjustments.

5 Claims, 1 Drawing Figure

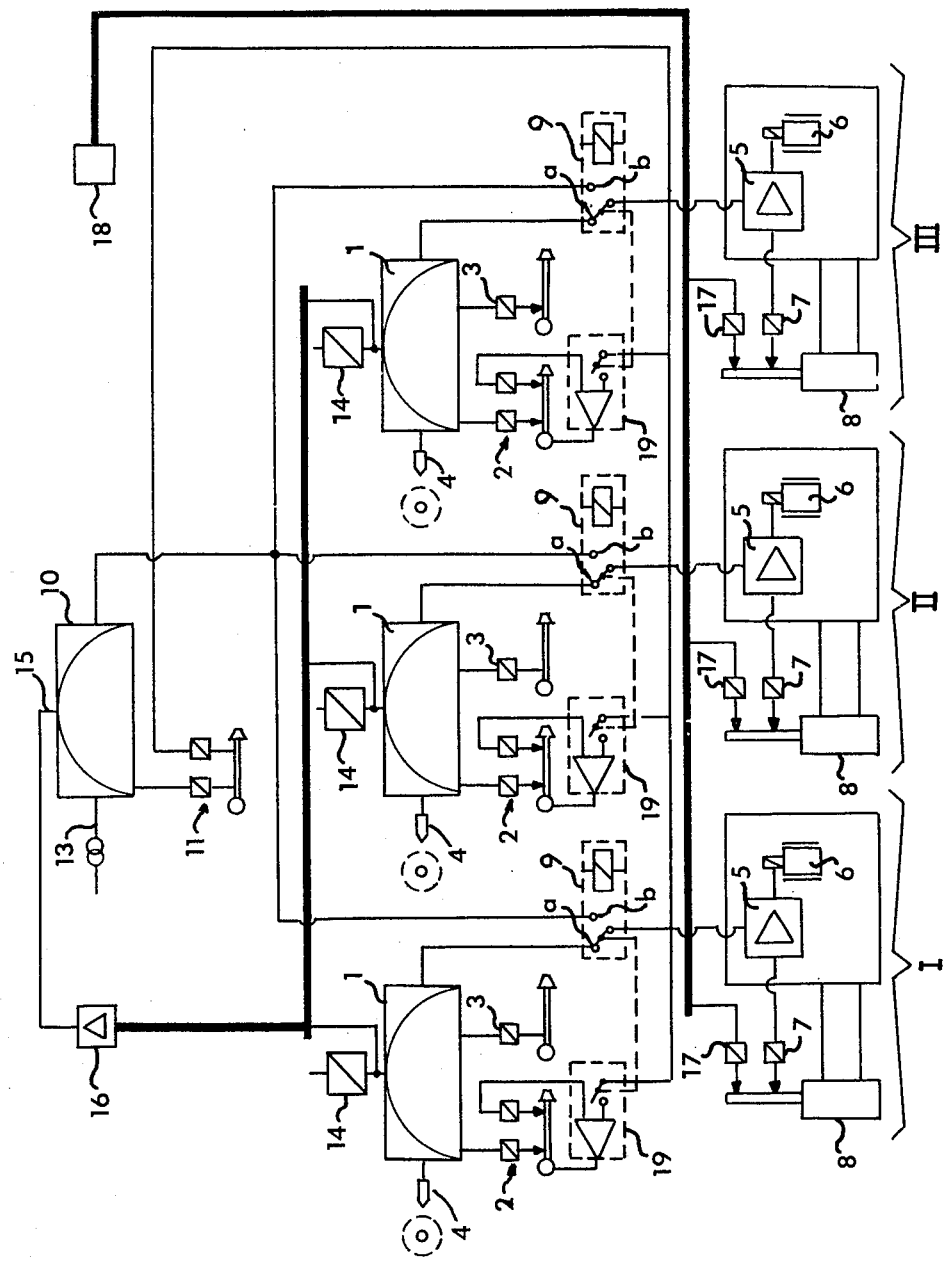

CONTROL INSTALLATION FOR AT LEAST TWO HYDRAULIC TURBINES

The present invention relates to a control installation for at least two hydraulic turbines adapted to be connected each to an independent network or simultaneously to the same network, comprising for each turbine a regulator sensitive to the changes in condition of the turbine with which it is associated and adapted to drive an electro-hydraulic apparatus operating the water input gating device of the said turbine.

It is known that in an installation comprising several turbines these latter are often controlled either individually, or simultaneously in accordance with how they are connected to independent networks or the same network. The individual control of each turbine is effected by means of a regulator with which it is associated. When it is desired to put all the turbines under the control of a communal control, a communication device permits connecting each regulator to a central system which then determines the consignment of the load for the assembly of turbines. This device, interesting in itself, presents however an inconvenience. In fact, if at the moment of the switching of the individual control to communal control, each turbine presents different regulating parameters, it would be necessary to modify these parameters, so as to adapt them to the new network. It is to be noted that if all these operations must be made from a central location, this involves permutations and changes at a distance which can become rapidly complicated in the case of centres comprising a great number of turbines. Moreover, this necessitates a control and locking device to avoid incorrect operation.

According to the present invention there is provided a control installation for at least two hydraulic turbines, adapted to be connected each to an independent network or simultaneously to the same network, comprising a regulator for each turbine responsive to the operational changes of the turbine with which it is associated and adapted to drive an electro-hydraulic apparatus operating the water input gating device of the said turbine, comprising a regulator operated in a manner to drive the electro-hydraulic apparatus operating the input device of each turbine simultaneously, the turbines being connected to a common network when a switching means is in a first position, the said switching means being adapted to occupy a second position in which each turbine is separately controlled by a respective regulator, the turbines each being connected to a respective independent network.

The present invention will be described further, by way of example, with reference to the accompanying schematic circuit diagram.

The installation shown in the drawing is conceived for controlling three turbines, these latter not being illustrated. For each turbine, there is an individual regulating circuit, these circuits each being the same and generally designated I, II and III.

Each of the circuits I, II and III comprises: a regulator 1 which has two associated control devices 2 and 3, one for fixing the load and the speed of the turbine, the other for limiting the opening of the gating circle; a monitoring device 4 providing a signal representative of the speed of rotation of the alternator to the regulator 1; and a monitoring device 14 for providing a signal representative of the force delivered by the alternator. As a function of the values received from these devices, the regulator 1 controls, in a known manner, an electro-hydraulic device for controlling a gating ring. To do this, the regulator 1 is connected electrically, when a relay 9 is in its non-energised position a, to an amplifier 5 controlling an electro-hydraulic converter 6 which controls a servo-motor 8, this latter being coupled to the gating ring and controlled via a transmitter 7.

The installation also includes a supplementary or communal regulator 10, of the same type as the regulators 1. This regulator 10 receives information from a device 11 for the communal working load. On an input 13, it receives a signal representative of the frequency of the grid, and on an input 15 a signal representative of the total power provided by the three turbines, this signal being delivered by a summing circuit 16, receiving signals from all of the devices 14.

When the relays 9 are energised and change over to a second position b, the regulator 10 is connected to all the electrohydraulic apparatus, which are then in parallel and controlled simultaneously by the regulator 10.

The functioning is described hereunder:

When each group I, II, III is connected to a different grid, the contact of the relays 9 is in the position a, so that each turbine is controlled by its respective regulator 1, this control is effected in known manner.

When it is desired to connect the three hydro-electric groups on a single grid, on the one hand, the outputs of the alternators or transformers are connected together, and on the other hand, the relays 9 are controlled so that each regulator 1 is inoperative, the regulator 10, being substituted for these regulators 1, simultaneously controls the three electro-hydraulic apparatus, but each group furnishes a third of the total power. The regulator 10 provides a signal which is a function of the control value given by the control device 11, the sum of the power represented by the signal delivered by the summing circuit 16 and the frequency of the grid represented by the signal received on the input 13. This common signal operates in the same manner as in the case of individual control.

The regulator 10 can thus be identical to the three other regulators 1. The regulating parameters of the individual functioning regulators 1 can be adjusted independently of the regulating parameters of the supplementary regulator 10. There can thus be seen that if it is desired to change the type of functioning, it suffices to switch control signals without at the same time having to adjust the parameters.

The installation also includes other devices. Each servomotor 8 is provided with a position controller 17, all these controllers being connected to a detector or monitor 18 verifying that all the servo-motors are in the position corresponding to the signal delivered by the regulator 10. This detector 18 can, in the case of mismatch or misadjustment, emit a signal, so that manual admustments can be made.

The installation also comprises a follower device 19 for each regulating circuit I, II and III, this device 19 being coupled to the corresponding relay 9. Each device 19 is formed in a manner that the control device 2 constantly follows the control device 11 when the installation is submitted to communal operation, which would permit a change-over without interruption from the communal operation method to the individual operation method.

One could also conceive other auxiliary devices such as a pressure supply control, a limitation of force or an output limiter. These devices can be added either to the individual regulators 1 or to the common regulator 10, or even to all the regulators 1 and 10. In this latter case, one can conceive different adjustments for each turbine, adapted to the conditions of use imposed in each of the cases, again without the necessity of supplementary switches.

In the case of stoppages of one or of several groups during the communal operation, the group or groups stopped must be returned to the control of its respective individual regulator 1, so as to control the resultant increase in the speed. To this end, the relays 9 can be made to depend on the position of the circuit breaker of the group and of the circuit breakers of the line. They can also be made to be controlled by a minimum power relay connected on each of the alternators.

It goes without saying that the installation comprising a switching of the control signal of the electro-hydraulic apparatus for controlling the gating ring is not limited to just three groups, as described here.

In the case of an installation presenting a certain number of groups, there can also be envisaged that only some of the groups are submitted to communal operation, the others remaining under individual operation.

There can also be conceived a control circuit permitting selecting the groups to be submitted to the communal operation, in a manner to adapt in a flexible manner the supply to the grids according to the demand.

There can also be envisaged an adaptation of the switching circuit so that one of the individual regulators performs the communal operation.

I claim:

1. A control installation for at least two hydraulic turbines, wherein each turbine is controlled by an independent network or simultaneously by a communal network, comprising a regulator for controlling each turbine individually responsive to operational changes of the turbine with which it is associated, and a communal regulator separate from and of the same type as said first named regulator for controlling the turbines simultaneously, and switching means for the regulators, said switching means having a first position in which the communal regulator controls the turbines and a second position in which the communal regulator is disconnected from the controls of the turbines and each turbine is separately controlled by its respective individual regulator.

2. An installation according to claim 1, in which the said switching means comprises respective relays each connected to an electro-hydraulic apparatus, each relay having two positions, one position providing connection of the regulator with the associated electrohydraulic apparatus, and the other position providing connection of the communal regulator to the electro-hydraulic apparatus for the simultaneous control.

3. An installation according to claim 1, including monitoring means connected to the communal regulator for delivering a signal in the case of a misadjustment.

4. An installation according to claims 1, wherein each regulator is provided with a control device and each regulator associated with a turbine is provided with a follower device coupled to the switching means, in such a manner that the control devices for the individual regulators, respectively associated with a turbine, follow the control device of the communal regulator.

5. An installation according to claim 1, including monitoring means connected to each individual regulator and to the communal regulator.

* * * * *